March 11, 1930.　　　E. E. HOLLISTER　　　1,750,597
AIR ACTUATED LIFTING DEVICE
Filed Aug. 24, 1926
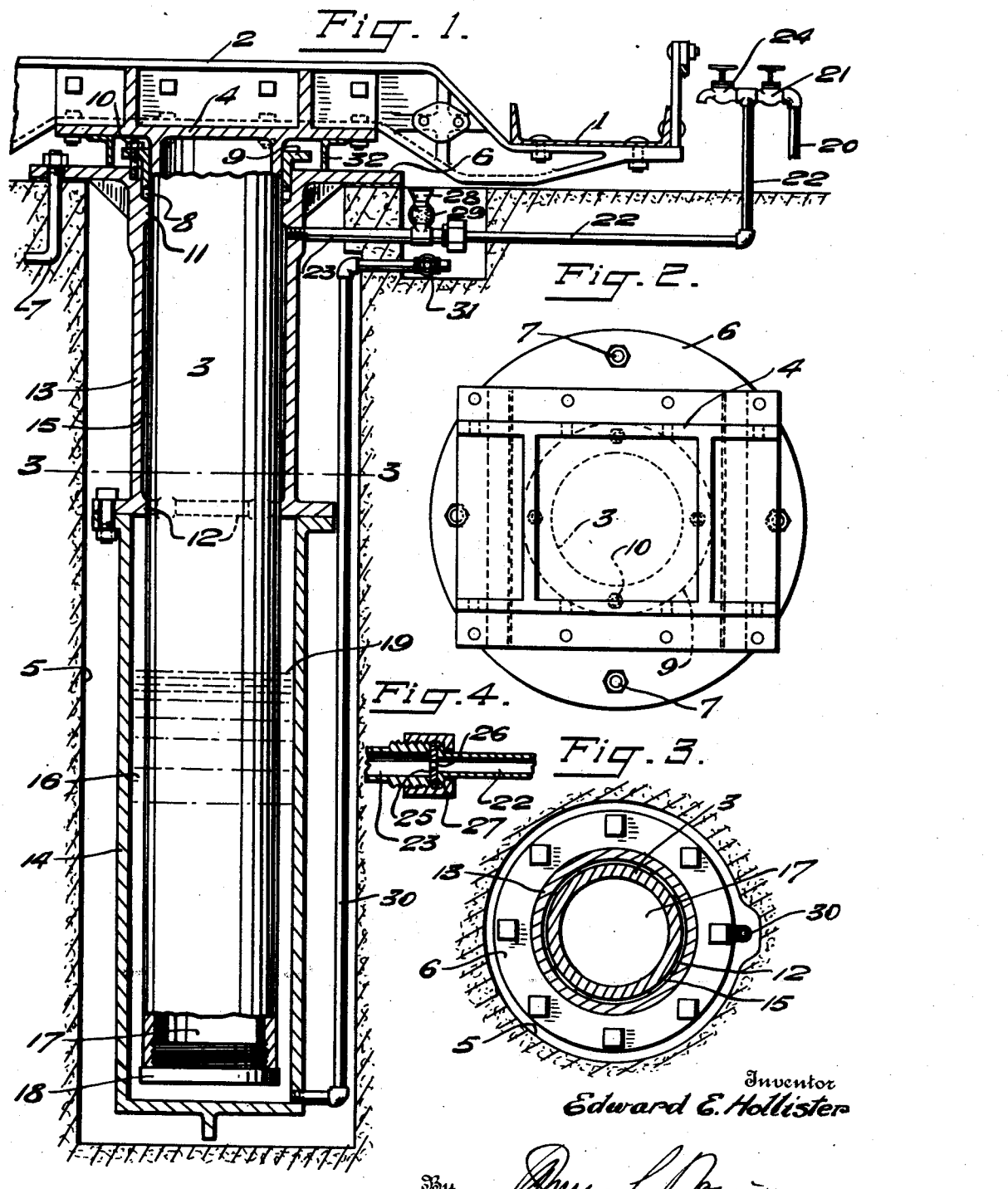
Inventor
Edward E. Hollister
By
Attorney Patented Mar. 11, 1930

1,750,597

UNITED STATES PATENT OFFICE

EDWARD E. HOLLISTER, OF QUINCY, ILLINOIS, ASSIGNOR TO HOLLISTER-WHITNEY COMPANY, OF QUINCY, ILLINOIS, A CORPORATION OF ILLINOIS

AIR-ACTUATED LIFTING DEVICE

Application filed August 24, 1926. Serial No. 131,262.

The present invention relates to improvements in lifting devices and it is applicable more especially to automobile lifts of the class employed for bodily lifting automobiles for the purpose of raising them above a floor to a height which will enable workmen to conveniently enter the space beneath the lifted automobile for inspection, servicing or repair of the different mechanisms or units thereof.

It is desirable, in an automobile lift of this class, to employ an air cylinder and plunger for lifting the table on which the automobile rests, in view of the speed and facility with which the table may be raised and lowered, the availability of a source of compressed air in shops, garages and other places where such a lift is used, and other advantages to be derived from the use of air for this purpose, but if air were used in an air cylinder of the types heretofore used for lifting purposes, there would be danger of damage to the automobile while the latter is being removed from the table due to the expansive action of the relatively large volume of air under high compression which remains in the cylinder at the moment the table is lowered under the added weight of the automobile and which would act to cause the table to suddenly rise when the weight of the automobile is removed therefrom, and such rise of the table, if permitted to occur, would cause damage to the part of an automobile struck by the suddenly rising table.

The present invention provides lifting means which is applicable to an automobile lift of this class and which enables air to be used as the actuating fluid with complete safety, means being provided whereby the final portion of the descent of the plunger, under the weight of the table and an automobile thereon, removes the air almost completly from the cylinder so that there is an insufficient amount of air remaining in the cylinder to lift the table after the latter has been relieved of the weight of the automobile.

The present invention also provides means for automatically lubricating the plunger and the surfaces of the cylinder in which it is guided and the stuffing box through which the plunger operates, thereby preventing wear of these parts.

Furthermore, the invention enables a lifting device of this character to be operated economically, it requiring the use of a minimum amount of compressed air, and simple and effective means is provided for arresting the upward movement of the plunger when the table has been fully raised.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 is a central vertical section through an air actuated lifting device constructed in accordance with the preferred embodiment of the invention, the lifting device being shown applied to an automobile lift;

Figure 2 is a top plan view of the cylinder and plunger of the lifting device;

Figure 3 represents a transverse section through the lifting device on the line 3—3 of Fig. 1; and Figure 4 is a detail sectional view of a choking or throttling device which may be used to limit the speed of ascent or descent of the lifting device.

Similar parts are designated by the same reference characters in the several views.

Lifting devices embodying the present invention are applicable generally to apparatus of different kinds, although it is especially applicable to automobile lifts, an example of which is shown and described in my co-pending application, Serial No. 131,261, filed Aug. 24, 1926. The preferred embodiment of the invention is shown in the accompanying drawing and will be hereinafter described in detail, but it is to be understood that the invention is not restricted to the precise construction shown as equivalent constructions are contemplated, and such will be included within the scope of the claims.

In the present instance, 1 designates one of the rails and 2 designates the bolster which connects a pair of these rails mid-way of their lengths and thus forms the table of an automobile lift, the automobile being driven or otherwise rolled onto the table so that its wheels rest on the rails thereon, after which the table is lifted to a suitable height above the floor to enable workmen to obtain access to the under side of the automobile for the purpose of inspection, servicing or repair. Reference is made to my co-pending application above referred to for a complete illustration and description of a type of automobile lift to which the present invention is applicable.

The air actuated lifting device embodying the present invention comprises a vertically movable plunger 3 which is preferably cylindrical in form and has a head 4 which is bolted or otherwise secured to the bolster 2 of the table. The plunger extends downwardly into a cylinder which is sunk in the floor of the shop, garage or other place where the lift is installed, the cylinder, for example, being sunk into the well 5 and supported therein by a flange 6 on the upper end of the cylinder which rests on the floor adjacent to the well, and a suitable number of anchoring bolts 7 serve to secure the cylinder in place. The upper end of the cylinder is provided with a stuffing box 8 which surrounds the plunger and serves to provide a fluid-tight fit between the plunger and cylinder, the gland 9 of the stuffing box being adjusted by the bolts 10. The plunger is guided in the upper portion of the cylinder by the circumferentially spaced upper and lower segmental bosses 11 and 12 which project inwardly from the wall of the cylinder and fit against the plunger, these bosses preventing lateral tipping of the plunger, especially when the latter is in its elevated position. The upper portion of the cylinder as just described may be formed of an upper section designated 13. The lower portion of the cylinder which may be composed of a cylinder section 14 which is closed at the bottom is flanged and bolted to the lower end of the upper cylinder section, and this lower section is sufficiently long to receive the plunger when the latter is fully lowered. The upper cylinder section 13 preferably has an interior diameter which is only slightly larger than that of the plunger, so that a relatively narrow space 15 of small cubic contents is formed between the plunger and this portion of the cylinder. The inside diameter of the lower cylinder section 14 may be of somewhat larger diameter than that of the cylinder section 13 to provide an annular fluid conducting space 16 between this cylinder section and the lower portion of the plunger.

The plunger may be cast or otherwise formed tubular, that is, with an interior chamber 17 which extends throughout its length, the top and side walls of the plunger, however, being imperforate or closed and the lower end of the plunger being closed by a cap 18 which is threaded or bolted thereon to form a fluid-tight joint therewith which will exclude fluid under pressure from the interior of the plunger. This cap, according to the present invention, is utilized not only to close the lower end of the plunger but also as a stop for arresting the up-stroke of the plunger, the cap being made of somewhat larger diameter than that of the plunger so that it will abut against the lower bosses 12 and thus prevent further rise of the plunger under the action of the fluid pressure content in the cylinder, when the plunger reaches the predetermined limit of its upward movement.

According to the present invention, means is provided for expelling the major portion of the air from the lower portion of the cylinder as the plunger approaches its lowermost position, thereby reducing the volume of compressed air in the cylinder acting on the plunger to the point where the remaining air will be insufficient to lift the table after the weight of the automobile has been removed therefrom. Preferably, such means consists of a body of oil 19 which is placed in the bottom of the cylinder, lubricating oil being preferably used, so that this body of oil will not only remove much of the air from the cylinder as the plunger descends, but the dipping of the lower end of the plunger into this body of oil will coat the surface of the plunger with a lubricant, so that upon the next upstroke of the plunger the lubricated surface of the plunger will pass the bosses 11 and 12 and also the stuffing box, and in so doing will lubricate them.

Compressed air for operating the lifting device may be obtained from any suitable type of compresser through a pipe 20 and fed through a control valve 21 to a pipe 22, the pipe 22 being connected to a pipe 23 which communicates with the space 15 between the upper portion of the plunger and the interior wall of the upper cylinder section 13. An air release valve 24 also leads from the pipe 22. Assuming the lower end of the cylinder contains a body of oil designated 19 and that the plunger is in its lowermost position and it is desired to raise it, the air supply valve 21 is opened while the valve 24 is closed, compressed air then flowing from the supply pipe 20 through the pipes 22 and 23 into the annular space 15 surrounding the upper portion of the plunger, this air flowing downwardly into the annular space 16 surrounding the lower portion of the plunger and acting on the surface of the body of oil 19, will impose pressure thereon which, acting against the bottom of the plunger will force the latter upwardly in the cylinder. After the plunger has lifted sufficiently to carry it out of contact with this body of oil, then the air which continues to flow into the cylinder will act directly on the bottom of the plunger. The plunger will thus be lifted, together with the table on its upper end and an automobile resting on the table until the projecting peripheral edge of the cap 18 on the bottom of the plunger comes against the lower bosses 12 whereupon the upward movement of the plunger and table will be arrested. The plunger and table may be maintained in such elevated position by maintenance of the air pressure within the cylinder or in any other suitable manner. When it is desired to lower the lift, the air supply valve 21 is closed and the air release valve 24 is opened. Air will then escape from the cylinder through the pipes 23 and 22 and the valve 24, and this reduction in the pressure within the cylinder will allow the plunger to descend under the weight of the table and the automobile thereon. As the descent of the plunger continues and it approaches its lower position, the lower end of the plunger will enter the body of oil contained in the bottom of the cylinder causing this oil to be displaced upwardly into the annular space 16 which surrounds the lower end of the plunger, and as the oil rises in this annular space, it expels the air ahead of it. At the time the plunger reaches the lower limit of its movement, the oil will have expelled most of the air from the cylinder, the air remaining in the upper portion of the space 16 and in the narrow space 15 being of relatively small volume so that when the automobile is driven or otherwise removed from the table, the consequent reduction in the weight acting to lower the plunger will not cause the plunger and table to rise, the remaining relatively small amount of air being insufficient in expansive volume to lift the table after removal of the automobile therefrom as the pressure of this air is quickly reduced by the continued venting of air from the cylinder after the table has reached its lowermost position.

In order to prevent unduly rapid rising or descent of the table, a disk 25 having a choke passage 26 therein is preferably interposed between the pipes 22 and 23, it being shown held in place in the present instance by the coupling 27 which joins these pipes. This choke passage is of a size which will limit the rate of flow of air to or from the cylinder and thereby automatically regulate the speed at which the plunger rises or falls and thus avoiding the necessity of adjusting the valves 21 and 24 to obtain such regulation. In order to further reduce the volume of air between the cylinder and the valves 21 and 24, the pipe 22 may be of relatively small diameter as shown. In order to facilitate charging of the cylinder with oil or replenishing of the oil therein from time to time, a fitting having a funnel-shaped inlet 28 may be connected to the pipe 23, this fitting being provided with a valve 29 which is normally closed but which can be opened during the introduction of oil. Oil supplied to this fitting will flow through the pipe 23 to the interior of the cylinder and will be added to the body of oil content in the bottom of the cylinder. If desired, a pipe 30 may be extended from the bottom of the cylinder up to a point near the floor level and provided with a valve 31 for the purpose of blowing off from the cylinder any water that may accumulate therein as well as sediment that may settle therein, and this pipe may also be used to blow off the oil content in the cylinder when it is desired to replace such oil with a fresh supply. The valve 31 in this pipe will be normally closed, but when it is desired to blow off water, sediment or oil the valve 31 is opened while compressed air is admitted to the cylinder, the pressure within the cylinder blowing the water, sediment or oil up through the pipe 30 to the surface where it may be suitably disposed of, after which the valve 31 is closed. The downward movement of the plunger is arrested by the flanges or angle irons 32 which are secured to the under side of the plunger head and are arranged to straddle the stuffing box and come to rest on the upper surface of the cylinder flange 6.

By admitting the compressed air to and discharging it from the upper portion of the cylinder, trapping or mixing of this air with the oil and escape of oil from the cylinder are avoided. By providing a plunger which is closed at the bottom and admitting air to the cylinder at the top thereof, the oil is never raised up to and around the packing gland and which, if permitted to occur, would cause objectionable leakage of oil at this point. While a small amount of air might leak past the packing if the stuffing box is not perfectly tight, such air leakage would be inconsequential, especially as the safety device provided by this invention will prevent premature descent of the plunger, due to that or any other cause.

I claim as my invention:—

1. A lifting device comprising a cylinder, a plunger reciprocable therein, means for supplying compressed air to the upper portion of the cylinder to actuate the plunger, and a body of liquid contained in the cylinder and displaceable by the plunger into a clearance space surrounding the plunger to expel air from the cylinder.

2. A lifting device comprising an upright cylinder having internal guides in its upper portion, a plunger reciprocable vertically in the cylinder and through said guides, a narrow space being provided between the plunger and the upper portion of the cylinder and passageways being provided between said space and the lower portion of the cylinder, means for supplying compressed air to said narrow space in the upper portion of the cylinder to actuate the plunger, and a body of liquid contained in the lower portion of the cylinder and displaceable upwardly along the sides of the plunger by the descending movement thereof.

In testimony whereof I have hereunto set my hand.

EDWARD E. HOLLISTER.